C. M. KIMBALL.
Railway-Car Truck.

No. 203,163. Patented April 30, 1878.

Witnesses.
S. N. Piper
L. W. Miller

Inventor
Charles M. Kimball
by his attorney
R. H. Eddy

UNITED STATES PATENT OFFICE.

CHARLES M. KIMBALL, OF BRADFORD, MASSACHUSETTS.

IMPROVEMENT IN RAILWAY-CAR TRUCKS.

Specification forming part of Letters Patent No. 203,163, dated April 30, 1878; application filed April 4, 1878.

*To all whom it may concern:*

Be it known that I, CHARLES M. KIMBALL, of Bradford, of the county of Essex and State of Massachusetts, have invented a new and useful Improvement in the Running-Gear or Mechanism of Railway - Carriages; and do hereby declare the same to be described in the following specification and represented in the accompanying drawings, of which—

Figure 1:
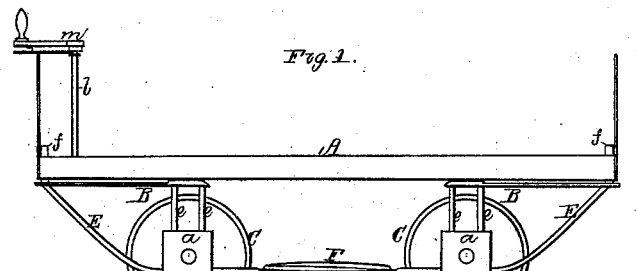
Figure 2:
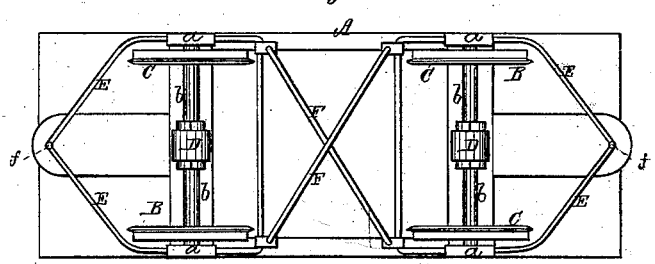
Figure 3:
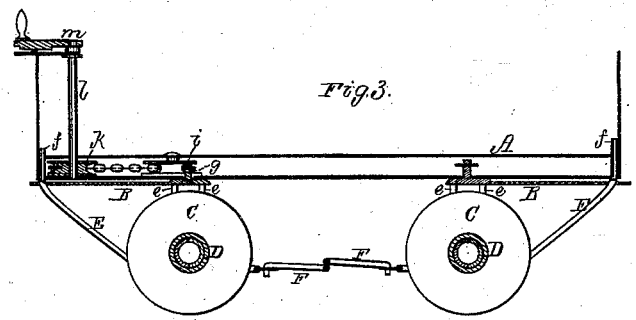
Figure 5:
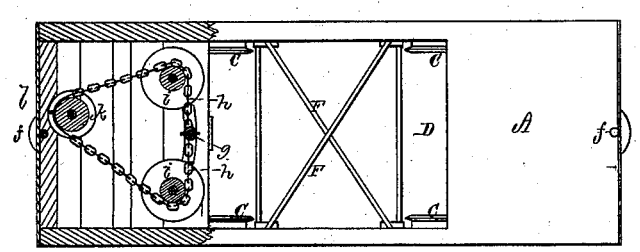
Figure 4:
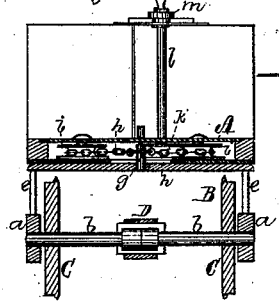

Figure 1 is a side elevation, Fig. 2 an under-side view, Fig. 3 a longitudinal section, Fig. 4 a transverse section, and Fig. 5, a sectional top view, of a carriage provided with my invention.

By means of the said invention the axles of the wheels become or may be adjusted to range with the radii of a curved track of a railway. Furthermore, each wheel of each axle can revolve independently of the other or its fellow, so as to enable the wheels to accommodate themselves to the variation in the lengths of the rails of the curved track.

In carrying out my improvement, I connect the two trucks by diagonal rods pivoted to them, and, instead of pivoting the trucks directly over the wheel-axles to the carriage body or platform, I pivot each truck nearer to the next adjacent end of such platform or body, or generally at about the distance from the axle of such truck that such axle is from the crossing of the diagonal rods, in consequence of which the trucks can turn or be turned simultaneously, so as to bring their axles to range to the center of the curve of the track, one truck, on being turned on its pivot, causing, through or by means of the diagonal rods, the other truck to have a corresponding motion in the proper direction.

In the drawings, A denotes the carriage-platform, and B B' its trucks, provided with boxes $a$ $a$, for supporting the axles of the wheels. In this case each axle is represented as a compound one, or composed of two separate semi-axles, $b$ $b$, having a wheel, C, fastened to each. Such semi-axles are connected at their middles by a coupling, D, or devices whereby one can revolve independently of the other, such being substantially as described in the United States Patent No. 198,747, granted January 1, 1878, to me.

From each truck an arm, E, projects toward the next adjacent end of the platform, and is connected with the wheel-boxes by stay-rods $e$ $e$. This arm, near its outer end, is pivoted to the platform, the pivot being shown at $f$. The said arm and its stay-rods constitute an extension of the truck.

The platform rests directly on the trucks; or there may be friction-wheels between the platform and each truck, for the platform to bear on.

The two trucks are connected together by the diagonal rods F F, arranged between them, as shown, such rods at their ends being pivoted to the trucks.

In order to enable the trucks to be moved by a person when standing on the platform, I extend upward from one or each of the trucks a pin, $g$, to which I connect the ends of a chain, $h$. This chain I carry around three grooved wheels, $i$ $k$ $i$, arranged in the platform, as shown, there being to the wheel $k$ a shaft, $l$, provided with a crank, $m$, all being as represented.

The chain I prefer to fix at one point to the periphery of the wheel $k$. On turning the crank either way, the truck-frame next it will be moved on its pivot by means of the connection-rods.

From the above it will be seen that, were the wheels of each pair not applied to trucks so as to be capable of revolving independently of each other, there would be, when the axles were out of parallelism or ranging in the radii of a curved track, a slipping or grinding of the inner wheels on the shorter rail of the curve; but with the wheels of each pair applied to the axle or car, so as to revolve independently of each other, each wheel, when the axles may be out of parallelism, will be at full liberty to adapt itself to its rail.

I am aware that the trucks of a railway-car have been connected by diagonal rods, and therefore do not claim such in case the trucks have their points arranged immediately over the axles.

I claim—

In combination with the two trucks connected by diagonal rods and pivoted to the platform in advance of the two axles, as set forth, the chain $h$, wheels $i$ $k$ $i$, and cranked shaft $l$, applied to each other and to the platform and one of the trucks, as explained.

CHARLES M. KIMBALL.

Witnesses:
R. H. EDDY,
JOHN R. SNOW.